(12) United States Patent
Payen et al.

(10) Patent No.: US 9,994,001 B2
(45) Date of Patent: *Jun. 12, 2018

(54) VISCOELASTIC PLASTIC INTERLAYER FOR VIBRO-ACOUSTIC DAMPING AND GLAZING COMPRISING SUCH AN INTERLAYER

(71) Applicant: SAINT-GOBAIN GLASS FRANCE, Courbevoie (FR)

(72) Inventors: Corinne Payen, Montmacq (FR); David Fournier, Breteuil (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 69 days.

This patent is subject to a terminal disclaimer.

(21) Appl. No.: 15/039,478

(22) PCT Filed: Nov. 25, 2014

(86) PCT No.: PCT/FR2014/053027
§ 371 (c)(1),
(2) Date: May 26, 2016

(87) PCT Pub. No.: WO2015/079159
PCT Pub. Date: Jun. 4, 2015

(65) Prior Publication Data
US 2017/0210097 A1    Jul. 27, 2017

(30) Foreign Application Priority Data
Nov. 27, 2013    (FR) ...................................... 13 61724

(51) Int. Cl.
*B32B 17/10*    (2006.01)
*B60J 1/06*    (2006.01)
(Continued)

(52) U.S. Cl.
CPC .. *B32B 17/10761* (2013.01); *B32B 17/10036* (2013.01); *B32B 17/1066* (2013.01);
(Continued)

(58) Field of Classification Search
CPC .......... B32B 17/1055; B32B 17/10761; B32B 17/10807; B32B 17/10036;
(Continued)

(56) References Cited

U.S. PATENT DOCUMENTS 3,592,726 A * 7/1971 Blizard ............. B32B 17/10036
428/215
6,074,732 A * 6/2000 Garnier ................... B32B 17/10
181/289
(Continued)

FOREIGN PATENT DOCUMENTS

DE    102006042538 A1 * 3/2008 ....... B32B 17/10036
EP       1 800 855 A1    6/2007
(Continued)

OTHER PUBLICATIONS

International Search Report dated Mar. 11, 2015 in PCT/FR2014/053027, filed Nov. 25, 2014.

*Primary Examiner* — Edgardo San Martin
(74) *Attorney, Agent, or Firm* — Oblon, McClelland, Maier & Neustadt, L,L.P.

(57) ABSTRACT

A viscoelastic plastic interlayer can be incorporated between two glass sheets to form a laminated glazing with vibro-acoustic damping properties. The interlayer includes at least one layer made of viscoelastic plastic with vibro-acoustic damping properties. The interlayer is tinted in the bulk at least on a part of its surface. The interlayer is such that the resonant frequency $f_2$ of the second resonance mode of a laminated glazing bar with a surface area of 25 mm×300 mm composed of two glass sheets each 2.1 mm thick, between (Continued)

which is incorporated the interlayer, determined by measuring the mechanical impedance (MIM) at 20° C. according to standard ISO 16940, is between 760 Hz and 1000 Hz and the loss factor $\eta_2$ of the second resonance mode of the bar, determined by MIM under the same conditions, is greater than or equal to 0.25.

17 Claims, 1 Drawing Sheet

(51) Int. Cl.
  *B60J 1/00* (2006.01)
  *B60R 13/08* (2006.01)
  *B60J 3/00* (2006.01)
  B32B 17/06 (2006.01)
  *B60J 1/02* (2006.01)

(52) U.S. Cl.
  CPC .............. *B60J 1/001* (2013.01); *B60J 3/007* (2013.01); *B60R 13/0815* (2013.01); *B32B 2250/03* (2013.01); *B32B 2307/102* (2013.01); *B32B 2605/006* (2013.01)

(58) Field of Classification Search
  CPC .......... B32B 2307/10; B32B 2307/102; B32B 2605/006; B60J 1/001; B60R 13/0815; B60R 13/08
  See application file for complete search history.

(56) References Cited

U.S. PATENT DOCUMENTS

| | | | | |
|---|---|---|---|---|
| 6,119,807 | A * | 9/2000 | Benson, Jr. | B32B 17/10 181/208 |
| 6,132,882 | A * | 10/2000 | Landin | B32B 17/10036 428/436 |
| 6,797,396 | B1 * | 9/2004 | Liu | B32B 17/10 359/359 |
| 7,297,407 | B2 * | 11/2007 | Anderson | B29C 55/023 428/355 R |
| 7,829,192 | B2 * | 11/2010 | Boure | B32B 17/10036 181/289 |
| 8,012,612 | B2 * | 9/2011 | Hasegawa | B32B 17/10339 428/432 |
| 8,628,856 | B2 * | 1/2014 | Iwamoto | B32B 17/10036 428/436 |
| 8,715,815 | B2 * | 5/2014 | Shimamoto | B32B 27/30 428/213 |
| 8,900,691 | B2 * | 12/2014 | Rehfeld | B32B 17/10 428/212 |
| 9,090,120 | B2 * | 7/2015 | Pires | B32B 17/10036 |
| 9,576,568 | B2 * | 2/2017 | Lu | G10K 11/168 |
| 9,616,641 | B2 * | 4/2017 | Cleary | B32B 17/10091 |
| 9,770,888 | B2 * | 9/2017 | Payen | B32B 17/10036 |
| 2007/0009714 | A1 | 1/2007 | Lee et al. | |
| 2007/0148472 | A1 | 6/2007 | Masaki et al. | |
| 2008/0176043 | A1 | 7/2008 | Masaki et al. | |
| 2009/0294212 | A1 | 12/2009 | Miyai | |
| 2010/0028642 | A1 | 2/2010 | Steuer et al. | |
| 2011/0094825 | A1 | 4/2011 | Miyai | |
| 2012/0003428 | A1 | 1/2012 | Miyai | |
| 2012/0094084 | A1 | 4/2012 | Fisher et al. | |
| 2013/0149503 | A1 * | 6/2013 | Yamamoto | B32B 17/10568 428/172 |
| 2013/0183507 | A1 * | 7/2013 | Matsuda | B32B 17/10036 428/213 |
| 2013/0316158 | A1 * | 11/2013 | Rehfeld | B32B 17/10036 428/215 |
| 2014/0162054 | A1 * | 6/2014 | Chen | H01L 51/5253 428/336 |
| 2014/0178651 | A1 | 6/2014 | Miyai | |
| 2017/0028687 | A1 * | 2/2017 | DeRosa | B64C 1/066 |
| 2017/0050415 | A1 * | 2/2017 | Kanki | B60J 1/001 |
| 2017/0087964 | A1 * | 3/2017 | Nakamura | B32B 17/10752 |
| 2017/0165945 | A1 * | 6/2017 | Payen | B32B 17/10036 |
| 2017/0239918 | A1 * | 8/2017 | Nakamura | B32B 17/06 |

FOREIGN PATENT DOCUMENTS

| | | | |
|---|---|---|---|
| EP | 1 958 764 A1 | 8/2008 | |
| EP | 2 153 989 A1 | 2/2010 | |
| FR | 3013630 A1 * | 5/2015 | ........ B32B 17/10036 |
| FR | 3013631 A1 * | 5/2015 | ........ B32B 17/10036 |
| FR | 3013632 A1 * | 5/2015 | ........ B32B 17/10036 |
| JP | 2001206742 A * | 7/2001 | ........ B32B 17/10761 |

* cited by examiner

VISCOELASTIC PLASTIC INTERLAYER FOR VIBRO-ACOUSTIC DAMPING AND GLAZING COMPRISING SUCH AN INTERLAYER

BACKGROUND

The invention relates to a viscoelastic plastic interlayer intended to be incorporated between two sheets of glass to form laminated glazing with vibroacoustic damping properties, intended especially for locomotive machines, in particular a motor vehicle.

Among all the qualities contributing to comfort in modern transportation means such as trains and motor vehicles, silence has become a determining factor.

Acoustic comfort has been improved over several years now, by treating noise, such as noise from the engine, rolling or suspension noise, either at their source or during their propagation through the air or through solids, by means, for example, of absorbent coatings or elastomeric connecting pieces.

The shapes of vehicles have also been modified to improve the penetration in air and to reduce the turbulence, which are themselves sources of noise.

In recent years, attention has been focused on the role that glazing might play in improving acoustic comfort, in particular laminated glazing comprising plastic interlayer films. Laminated glazing also has other advantages, such as elimination of the risk of projection of fragments in the event of sudden breakage, constituting an effraction retarder.

It has been demonstrated that the use of standard plastic films in laminated glazing is unsuitable for improving acoustic comfort. Specific plastic films were then developed, which had damping properties that allow an improvement in the acoustic comfort.

Moreover, in the existing windscreens, the thickness of the glass sheet intended to be turned facing the exterior of the vehicle is generally 2.1 mm and the thickness of the glass sheet intended to be turned facing the interior of the vehicle is generally 1.6 mm. However, the tendency is towards lightening motor vehicles in order to reduce their consumption and the induced discharge of $CO_2$. One means is to propose lighter motor vehicle glazing. One solution for reducing the weight of glazing is to reduce the thickness of the glass sheets. However, this reduction of thickness results in a degradation of the acoustic properties of the laminated glazing.

Moreover, it is also important to provide intimacy to persons inside a vehicle or to protect the driver of a vehicle from being dazzled by sunlight or simply to afford an aesthetic effect.

There is thus a need for a viscoelastic plastic interlayer intended to be incorporated between two glass sheets to form a laminated glazing with vibro-acoustic damping properties, which allows a reduction of the thickness of the glass sheets without degradation of the vibro-acoustic damping properties, while at the same time providing intimacy to persons inside a vehicle or protecting the driver of a vehicle from being dazzled by sunlight or simply to afford an aesthetic effect.

BRIEF SUMMARY

To do this, the invention proposes a viscoelastic plastic interlayer intended to be incorporated between two glass sheets to form a laminated glazing with vibro-acoustic damping properties, the interlayer comprising at least one layer made of viscoelastic plastic with vibro-acoustic damping properties and the interlayer being tinted in the bulk at least on a part of its surface, the interlayer being such that the resonant frequency $f_2$ of the second resonance mode of a laminated glazing bar with a surface area of 25 mm×300 mm composed of two glass sheets each 2.1 mm thick, between which is incorporated the interlayer, determined by measuring the mechanical impedance (MIM) at 20° C. according to standard ISO 16940, is between 760 Hz and 1000 Hz and the loss factor $\eta_2$ of the second resonance mode of the same bar, determined by MIM under the same conditions, is greater than or equal to 0.25.

According to another particular feature, the layer is based on polyvinyl butyral and plasticizer.

According to another particular feature, the resonant frequency $f_2$ is between 800 and 900 Hz and preferably between 800 Hz and 850 Hz.

According to another particular feature, the loss factor $\eta_2$ is greater than 0.30.

According to another particular feature, the interlayer also comprises two outer layers made of standard PVB, the layer being between the two outer layers.

According to another particular feature, the measurement of the mechanical impedance is performed at least 1 month after assembling the laminated glazing bar, the laminated glazing bar having itself been assembled at least 1 month after the manufacture of the interlayer.

The invention also relates to glazing comprising:
a glass sheet between 0.5 mm and 2.6 mm thick,
a glass sheet between 0.5 mm and 1.6 mm thick,
an interlayer described above, the interlayer being between the glass sheets, in which the total thickness of the glass sheets is strictly less than 3.7 mm.

According to another particular feature, the interlayer is tinted in its upper part.

According to another particular feature, the interlayer is tinted over its entire surface.

The invention also relates to a motor vehicle comprising glazing described above, the glass sheet between 0.5 mm and 2.6 mm thick being turned facing the exterior of the vehicle and the glass sheet between 0.5 mm and 1.6 mm thick being turned facing the interior of the vehicle.

The invention also relates to the use of the glazing described above as a motor vehicle windscreen.

According to another particular feature, the glazing is used as a front side window, a rear side window, a rear window or a quarter glass of a motor vehicle.

BRIEF DESCRIPTION OF THE DRAWINGS

Other characteristics and advantages of the invention will now be described with regard to the drawings, in which.

DETAILED DESCRIPTION

The invention relates to a viscoelastic plastic interlayer intended to be incorporated between two glass sheets to form laminated glazing with vibro-acoustic damping properties. The interlayer comprises at least one layer made of viscoelastic plastic with vibro-acoustic damping properties.

The interlayer is such that the resonant frequency $f_2$ of the second resonance mode of a laminated glazing bar with a surface area of 25 mm×300 mm composed of two glass sheets each 2.1 mm thick, between which is incorporated the interlayer, determined by measuring the mechanical impedance (MIM) at 20° C. according to standard ISO 16940 (with only one difference concerning the thickness of the glass sheets of the bar, which is 2.1 mm instead of 4 mm), is between 760 Hz and 1000 Hz and the loss factor $\eta_2$ of the second resonance mode of the same bar, determined by MIM under the same conditions, is greater than or equal to 0.25.

Furthermore, the interlayer is tinted in the bulk at least on a part of its surface, which, in the event of tinting over the entire surface, provides intimacy to persons inside a vehicle or simply affords an aesthetic effect, or alternatively, in the case of tinting in the upper part of a windscreen, protects the driver of a vehicle from being dazzled by sunlight.

The inventors have demonstrated, as will be seen later, that an interlayer comprising these characteristics makes it possible to obtain thinned laminated glazing whose acoustic performance qualities are equivalent or even superior to those of laminated glazing with standard thicknesses of glass incorporating a known interlayer with improved acoustic properties.

The interlayer according to the invention is intended to be incorporated between two glass sheets to form laminated glazing.

Figure 2:
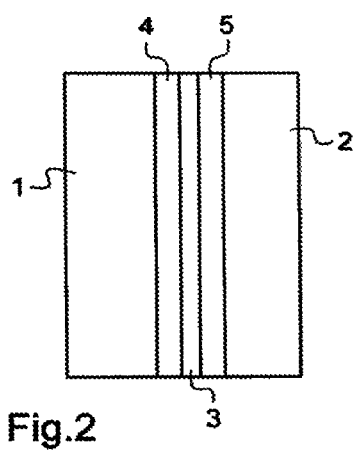
FIG. 2 shows a view in cross section of glazing according to the invention.

FIG. 2 shows a view in cross section of glazing according to the invention.

The glazing comprises two glass sheets, 1, 2 between which is inserted the interlayer according to the invention. The solid connection of the interlayer to the glass sheets is made by known means, for example by stacking the glass sheets and the interlayer and by passing the assembly into an autoclave.

The glass sheet 1 of the glazing is intended to be turned facing the exterior of the vehicle, whereas the glass sheet 2 is intended to be turned facing the interior of the vehicle. The glass sheet 1 is preferably thicker than the glass sheet 2 such that the glazing affords better protection against external attack (inclement weather, projection of gravel, etc.). Specifically, the thicker the glass, the greater its mechanical strength. However, the thicker the glass is, the heavier it is. A compromise must thus be found between the mechanical strength and the weight of the glazing. Thus, the thickness of the glass sheet 1 is, for example, between 0.5 mm and 2.6 mm and preferably between 1.4 mm and 2.0 mm, and the thickness of the glass sheet 2 is, for example, between 0.5 mm and 1.6 mm and preferably between 1.1 mm and 1.5 mm.

In the existing glazing, the thickness of the glass sheet 1 is generally 2.1 mm and the thickness of the glass sheet 2 is generally 1.6 mm, i.e. a total glass thickness of 3.7 mm.

The glazing according to the present invention comprises a total glass thickness strictly less than 3.7 mm, preferably less than or equal to 3.2 mm.

Preferably, according to the invention, the thickness of the glass sheet 1 is 1.8 mm and the thickness of the glass sheet 2 is 1.4 mm so as to limit the weight of the glazing, which makes it possible to reduce the consumption of fuel of a vehicle equipped with such glazing. This also makes it possible to manipulate the glazing more easily and to save on material.

The glazing according to the invention may also have a glass sheet 1 1.6 mm thick and a glass sheet 2 1.2 mm thick, or a glass sheet 1 1.4 mm thick and a glass sheet 2 1.1 mm thick.

The interlayer is constituted by at least one layer 3 made of viscoelastic plastic with vibro-acoustic damping properties. It is preferably based on polyvinyl butyral and plasticizer. The content and nature of the plasticizer and the degree of acetalization of the polyvinyl butyral make it possible to modify in a known manner the rigidity of a component based on polyvinyl butyral and plasticizer.

In the example of FIG. 2, the interlayer also comprises two layers 4, 5, referred to as outer layers, between which is inserted the layer 3.

The outer layers 4, 5 are preferably made of standard PVB. The layer 3 is less rigid than the outer layers 4, 5 so as to vibrate correctly to ensure the desired acoustic damping.

As a variant, the interlayer may comprise at least two layers made of viscoelastic plastic with vibro-acoustic damping properties, optionally surrounded by layers of standard PVB.

The acoustic characteristics of the interlayer are determined by measuring the mechanical impedance (MIM) at 20° C. according to standard ISO 16940 of a laminated glazing bar with a surface area of 25 mm×300 mm composed of two glass sheets each 2.1 mm thick (and not 4 mm thick as recommended in standard ISO 16940), between which is incorporated an interlayer according to the invention, i.e. an interlayer comprising at least one layer of viscoelastic plastic with vibro-acoustic damping properties.

MIM makes it possible to determine the resonant frequencies and the loss factors of the various resonance modes of the laminated glazing bar.

The interlayer is in accordance with the invention if the resonant frequency $f_2$ of the second resonance mode of the laminated glazing bar determined by MIM is between 760 Hz and 1000 Hz and the loss factor $\eta_2$ of the second resonance mode of the laminated glazing bar determined by MIM is greater than or equal to 0.25.

Preferably, the resonant frequency $f_2$ is between 800 Hz and 900 Hz, which makes it possible to have improved acoustic performance qualities while degrading less the level of weakening of the laminated glazing before the critical frequency. More preferably, the resonant frequency $f_2$ is between 800 Hz and 850 Hz, which makes it possible to have more improved acoustic performance qualities while degrading even less the level of weakening of the laminated glazing before the critical frequency.

Preferably, the loss factor $\eta_2$ is greater than 0.30, which makes it possible to have improved acoustic performance qualities while improving the acoustic damping.

The measurement of the mechanical impedance (MIM) is performed at least 1 month after assembling the laminated glazing bar, the laminated glazing bar itself having been assembled at least 1 month after the manufacture of the interlayer. This makes it possible to be sure that the interlayer and the laminated glazing have achieved stable states and thus to determine reliable values.

Figure 1:
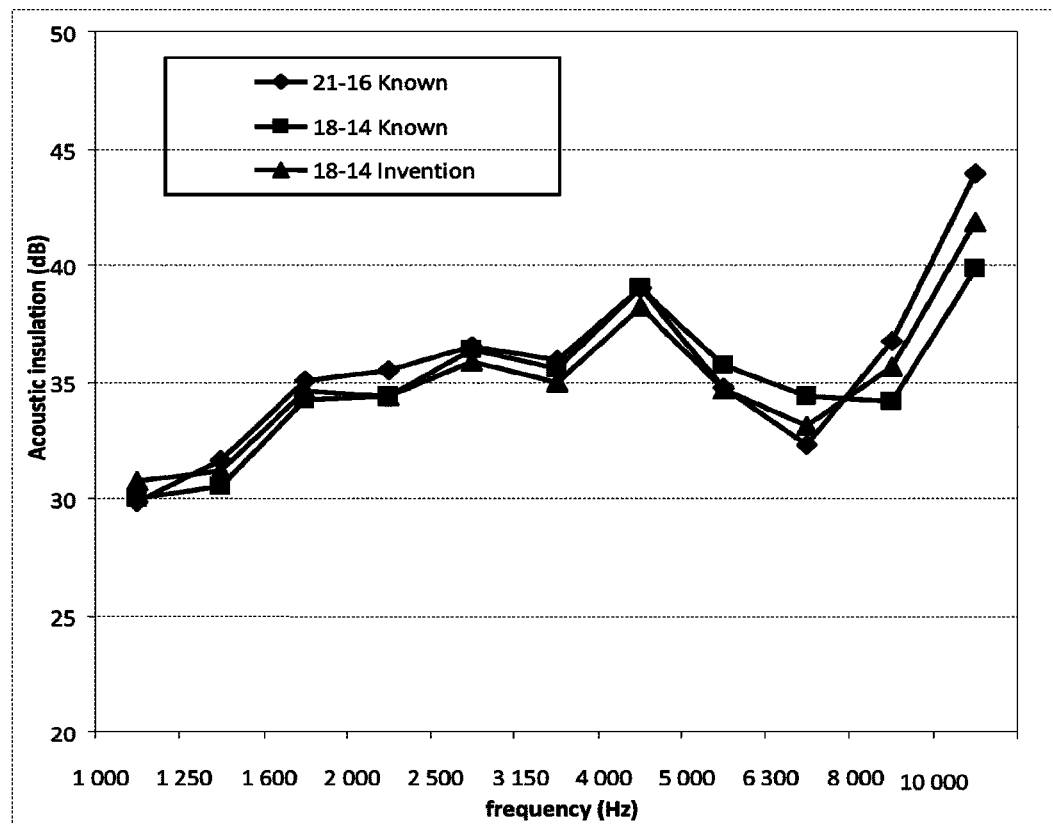
FIG. 1 shows a curve of the acoustic insulation as a function of the frequency, measured on three windscreens.

FIG. 1 shows a curve of the acoustic insulation as a function of the frequency, measured on three windscreens. The acoustic insulation of a glazing takes into account the acoustic performance qualities that may be observed on a vehicle equipped with the said glazing.

Thus, a first windscreen (21-16 known) comprises:
two glass sheets 2.1 mm and 1.6 mm thick, respectively, and
an interlayer comprising two outer layers made of standard PVB and a central layer made of viscoelastic plastic with vibro-acoustic damping properties, the interlayer having a resonant frequency $f_2$ of 675 Hz (±15 Hz) and a loss factor $\eta_2$ equal to 0.35 (±0.03).

The first windscreen corresponds to a standard windscreen with a known interlayer with acoustic damping properties.

The curve of acoustic insulation (shown as diamonds) of the first windscreen shows a dip at about 6500 Hz.

A second windscreen (18-14 known) comprises:
two glass sheets 1.8 mm and 1.4 mm thick, respectively, and
an interlayer comprising two outer layers made of standard PVB and a central layer made of viscoelastic plastic with vibro-acoustic damping properties, the interlayer having a resonant frequency $f_2$ of 675 Hz (±15 Hz) and a loss factor $\eta_2$ equal to 0.35 (±0.03).

The second windscreen corresponds to a thinned windscreen with an interlayer identical to that of the first windscreen.

The curve of acoustic insulation (shown by squares) of the second windscreen shows similar behaviour to that of the first windscreen up to about 5000 Hz, but a dip shifted towards the high frequencies, at about 8000 Hz. This shift in the dip is very troublesome since it implies that this windscreen allows aerial noise to pass at high frequencies that are irritating to the human ear.

A third windscreen (18-14 invention) comprises:
two glass sheets 1.8 mm and 1.4 mm thick, respectively, and
an interlayer comprising two outer layers made of standard PVB and a central layer made of viscoelastic plastic with vibro-acoustic damping properties, the interlayer having a resonant frequency $f_2$ of 800 Hz (±15 Hz) and a loss factor $\eta_2$ equal to 0.30 (±0.03).

The third windscreen corresponds to a thinned windscreen with an interlayer according to the invention.

The curve of acoustic insulation (shown by triangles) of the third windscreen shows behaviour similar to that of the first windscreen, with a dip centred at about 6500 Hz and acoustic insulation values similar to those of the first windscreen.

The windscreen with an interlayer according to the invention thus indeed makes it possible to compensate for the acoustic degradation associated with the thinning of the glazing.

The laminated glazing according to the invention may be used as a motor vehicle windscreen. In this case, it of course satisfies all the conditions of rule No. 43 of the United Nations (known as rule R43) of hard impact strength for ensuring its mechanical strength. To do this, in the case of an interlayer comprising two outer layers made of standard PVB, the thickness of these outer layers 4, 5 is, for example, adapted in a known manner, for example by patent application FR 09 52567.

Moreover, the interlayer is tinted in the bulk at least on a part of its surface. When it is tinted only in the upper part of a windscreen, it protects the driver of a vehicle from being dazzled by sunlight. When it is tinted over its entire surface, it provides intimacy to persons inside a vehicle. When the tinting is weak, it simply has an aesthetic effect. In the event of light transmission that is too low with regard to the existing standards for a windscreen or front side windows, it may be used in a rear side window, in a rear window or in a quarter glass of a motor vehicle.

The invention claimed is:

1. A viscoelastic plastic interlayer to be incorporated between two glass sheets to form a laminated glazing with vibro-acoustic damping properties, the interlayer comprising:
   at least one layer made of viscoelastic plastic with vibro-acoustic damping properties,
   the interlayer being tinted in the bulk at least on a part of a surface of the interlayer,
   the interlayer being such that a resonant frequency $f_2$ of a second resonance mode of a laminated glazing bar with a surface area of 25 mm×300 mm composed of two glass sheets each 2.1 mm thick, between which is incorporated the interlayer, determined by measuring a mechanical impedance (MIM) at 20° C. according to standard ISO 16940, is between 760 Hz and 1000 Hz and a loss factor $\eta_2$ of the second resonance mode of the laminated glazing bar, determined by MIM under the same conditions, is greater than or equal to 0.25.

2. The interlayer according to claim 1, in which the layer includes polyvinyl butyral and plasticizer.

3. The interlayer according to claim 1, in which the resonant frequency $f_2$ is between 800 and 900 Hz.

4. The interlayer according to claim 1, in which the loss factor $\eta_2$ is greater than 0.30.

5. The interlayer according to claim 1, further comprising:
   two outer layers made of standard polyvinyl butyral (PVB), the layer being between the two outer layers.

6. The interlayer according to claim 1, in which the measurement of the mechanical impedance is performed at least one month after assembly of the laminated glazing bar, the laminated glazing bar having been assembled at least one month after manufacture of the interlayer.

7. A glazing, comprising:
   a first glass sheet between 0.5 mm and 2.6 mm thick,
   a second glass sheet between 0.5 mm and 1.6 mm thick,
   the interlayer according to claim 1, the interlayer being between the first and second glass sheets,
   in which a total thickness of the first and second glass sheets is less than 3.7 mm.

8. The glazing according to claim 7, in which the interlayer is tinted only in an upper part.

9. The glazing according to claim 7, in which the interlayer is tinted over an entire surface.

10. A motor vehicle, comprising:
    the glazing according to claim 7, the first glass sheet between 0.5 mm and 2.6 mm thick being turned facing an exterior of the vehicle and the second glass sheet between 0.5 mm and 1.6 mm thick being turned facing an interior of the vehicle.

11. The glazing according to claim 7, wherein the glazing is a motor vehicle windscreen.

12. The glazing according to claim 7, wherein the glazing is as a windscreen, a front side window, a rear side window, a rear window or a quarter glass of a motor vehicle.

13. The interlayer according to claim 1, in which the resonant frequency $f_2$ is between 800 and 850 Hz.

14. The glazing according to claim 7, wherein the first glass sheet is between 1.4 mm and 2.0 mm thick and the second glass sheet is between 1.1 mm and 1.5 mm thick.

15. The glazing according to claim 7, wherein the first glass sheet is 1.8 mm thick and the second glass sheet is 1.4 mm thick.

16. The glazing according to claim 7, wherein the first glass sheet is 1.6 mm thick and the second glass sheet is 1.2 mm thick.

17. The glazing according to claim 7, wherein the first glass sheet is 1.4 mm thick and the second glass sheet is 1.1 mm thick.

* * * * *